JOSEPH H. OSGOOD, OF PEABODY, MASSACHUSETTS.

Letters Patent No. 83,786, dated November 3, 1868.

IMPROVED PROCESS OF RECOVERING THE MATERIALS OF WORN-OUT PRINTERS' ROLLERS.

The Schedule referred to in these Letters Patent and making part of the same.

*To all whom it may concern:*

Be it known that I, JOSEPH H. OSGOOD, of Peabody, in the county of Essex, and State of Massachusetts, have invented a process by which I can separate and utilize the ingredients of roller-composition; and the following is a full, clear, and exact description thereof.

Roller-composition, used by printers, is composed of glycerine, glue, and some saccharine element principally. When the rollers are partly worn out, they are no longer useful to the printer, and are thrown away. Thus much material is lost.

My object has been to restore this lost material to useful purposes, and I have succeeded in separating and utilizing the ingredients of roller-composition, so that I can use them in making new composition. By this I save large quantities of material heretofore considered lost, so far as value or utility is concerned.

My process consists in soaking the discarded composition in cold water, renewing the water two or three times.

This eliminates the saccharine element of the composition, leaving the glue. The sirup is recovered by evaporation. The glue is solidified in same way.

I best accomplish the result sought by placing roller-composition in a shallow tank with perforated false bottom. The composition is distributed over the surface of the false bottom, and the tank filled with cold water. The saccharine matter of the composition percolates through the false bottom, and charges the water, which is drawn off and evaporated. The glue, which remains on the false bottom, is solidified by evaporation. The glycerine remains in a degree in each, the glue and saccharine, but does not prevent these restored ingredients being used in new composition.

This process can be employed at considerable profit, and prevents a great loss, heretofore absolute.

Having described my invention,

What I claim as new, and desire to secure by Letters Patent, is—

The process for utilizing the ingredients of discarded roller-composition, substantially as described and specified.

In testimony whereof, I have signed my name to this specification in, the presence of two subscribing witnesses.

JOSEPH H. OSGOOD.

Witnesses:
CARROLL D. WRIGHT,
ALEX. N. REDMAN.